US008550968B2

(12) United States Patent
Sugimura et al.

(10) Patent No.: US 8,550,968 B2
(45) Date of Patent: Oct. 8, 2013

(54) DEVELOPING ROLLER AND IMAGING APPARATUS COMPRISING THE SAME

(75) Inventors: Takayuki Sugimura, Yokohama (JP); Kouta Kawano, Yokohama (JP); Takuro Sugimoto, Yokohama (JP); Hirotaka Tagawa, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 1596 days.

(21) Appl. No.: 11/594,120

(22) Filed: Nov. 8, 2006

(65) Prior Publication Data

US 2007/0111874 A1 May 17, 2007

(30) Foreign Application Priority Data

Nov. 11, 2005 (JP) ................................ 2005-327432
Nov. 11, 2005 (JP) ................................ 2005-327439
Nov. 11, 2005 (JP) ................................ 2005-327512
Nov. 11, 2005 (JP) ................................ 2005-327564
Apr. 14, 2006 (JP) ................................ 2006-112291

(51) Int. Cl.
*F16C 13/00* (2006.01)

(52) U.S. Cl.
USPC ................................................ 492/56; 492/53

(58) Field of Classification Search
USPC ................................................ 492/56, 53, 49
See application file for complete search history.

(56) References Cited

U.S. PATENT DOCUMENTS 3,629,200 A * 12/1971 Brotherton et al. ............. 528/65
3,677,983 A * 7/1972 Brotherton et al. ........... 521/160
3,950,833 A * 4/1976 Adams ............................ 492/53
4,447,591 A * 5/1984 Watanabe et al. ............... 528/80
4,507,458 A * 3/1985 Shiraki et al. ................... 528/49
5,600,422 A * 2/1997 Fukami et al. ................ 399/313
5,834,116 A * 11/1998 Sawa et al. .................... 428/375
6,009,297 A * 12/1999 Maeda et al. ................. 399/302
6,035,172 A * 3/2000 Mimura et al. ............... 399/286
6,270,449 B1 * 8/2001 Hirayama ....................... 492/54
6,555,210 B1 * 4/2003 Masuda et al. ................ 428/212
6,629,915 B1 * 10/2003 Ohki et al. ...................... 492/54
6,685,612 B2 * 2/2004 Hirayama ....................... 492/56
6,734,274 B2 * 5/2004 Suzuki et al. .................. 528/76

(Continued)

FOREIGN PATENT DOCUMENTS

CN 1203385 12/1998
CN 1261446 7/2000

(Continued)

OTHER PUBLICATIONS

Chinese Office Action dated Aug. 8, 2008 (with translation) (12 pages).

(Continued)

*Primary Examiner* — Essama Omgba
(74) *Attorney, Agent, or Firm* — Sughrue Mion, PLLC

(57) ABSTRACT

There is a developing roller having a low compression permanent strain without contaminating a photosensitive drum and deteriorating toners. The developing roller 1 comprises a shaft 2, an elastic layer 3 formed on an outer periphery of the shaft 2 and a surface coating layer 4 formed on an outer peripheral face of the elastic layer 3, in which the surface coating layer 4 comprises a urethane resin formed by crosslinking a lactone-modified polyol with a polyisocyanate. The urethane resin is preferable to be formed by crosslinking the lactone-modified polyol with two or more kinds of polyisocyanates.

22 Claims, 1 Drawing Sheet

(56) References Cited

U.S. PATENT DOCUMENTS

| | | | | |
|---|---|---|---|---|
| 6,818,674 | B2 * | 11/2004 | Sakata et al. | 521/110 |
| 7,007,384 | B2 * | 3/2006 | Hirayama | 29/895.3 |
| 7,515,842 | B2 * | 4/2009 | Takayanagi | 399/45 |
| 7,544,158 | B2 * | 6/2009 | Yamada et al. | 492/56 |
| 7,697,874 | B2 * | 4/2010 | Izutani et al. | 399/281 |
| 2002/0091170 | A1 * | 7/2002 | Sakata et al. | 521/86 |
| 2003/0013588 | A1 * | 1/2003 | Hirayama | 492/56 |
| 2005/0202209 | A1 * | 9/2005 | Okuda et al. | 428/141 |
| 2006/0252619 | A1 * | 11/2006 | Yamada et al. | 492/56 |
| 2007/0147861 | A1 * | 6/2007 | Takayanagi | 399/45 |
| 2007/0149377 | A1 * | 6/2007 | Motokawa et al. | 492/28 |
| 2007/0197362 | A1 * | 8/2007 | Sakata et al. | 492/49 |
| 2008/0146427 | A1 * | 6/2008 | Osaku | 492/56 |
| 2008/0232864 | A1 * | 9/2008 | Izutani et al. | 399/286 |
| 2010/0014891 | A1 * | 1/2010 | Sakata | 399/176 |

FOREIGN PATENT DOCUMENTS

| | | | | |
|---|---|---|---|---|
| CN | 1534400 | | | 10/2004 |
| EP | 1184397 | A1 | * | 3/2002 |
| JP | 63048570 | A | * | 3/1988 |
| JP | 5313474 | A | | 11/1993 |
| JP | 8-305132 | A | | 11/1996 |
| JP | 9120196 | A | | 5/1997 |
| JP | 11100549 | A | * | 4/1999 |
| JP | 11159523 | A | * | 6/1999 |
| JP | 2000-346050 | A | | 12/2000 |
| JP | 2001188412 | A | * | 7/2001 |
| JP | 2002068515 | A | * | 3/2002 |
| JP | 2002-310126 | A | | 10/2002 |
| JP | 2002-310136 | A | | 10/2002 |
| JP | 2002309186 | A | | 10/2002 |
| JP | 2003066713 | A | | 3/2003 |
| JP | 2003137952 | A | | 5/2003 |
| JP | 2003270926 | A | * | 9/2003 |
| JP | 2004-027054 | A | | 1/2004 |
| JP | 2004051249 | A | * | 2/2004 |
| JP | 2004-285114 | A | | 10/2004 |
| JP | 2005-24674 | A | | 1/2005 |
| JP | 2005-128381 | A | | 5/2005 |
| JP | 2005141192 | A | | 6/2005 |
| JP | 2005-300598 | A | | 10/2005 |
| JP | 2006078636 | A | * | 3/2006 |
| JP | 2007086252 | A | * | 4/2007 |
| JP | 2007298662 | A | * | 11/2007 |
| JP | 11-212354 | A | | 8/2011 |

OTHER PUBLICATIONS

Chinese Office Action issued in Chinese Application No. 200610138136.4 dated Jul. 29, 2011.

Japanese Office Action issued in Application No. 2006-112291 dated Mar. 1, 2012.

Japanese Office Action issued in Japanese Application No. 2005-327432 dated Nov. 8, 2011. (with translation).

Japanese Office Action issued in Japanese Application No. 2005-327439 dated Nov. 8, 2011. (with translation).

Japanese Office Action issued in Japanese Application No. 2005-327564 dated Oct. 4, 2011. (with translation).

* cited by examiner

F/G. 1
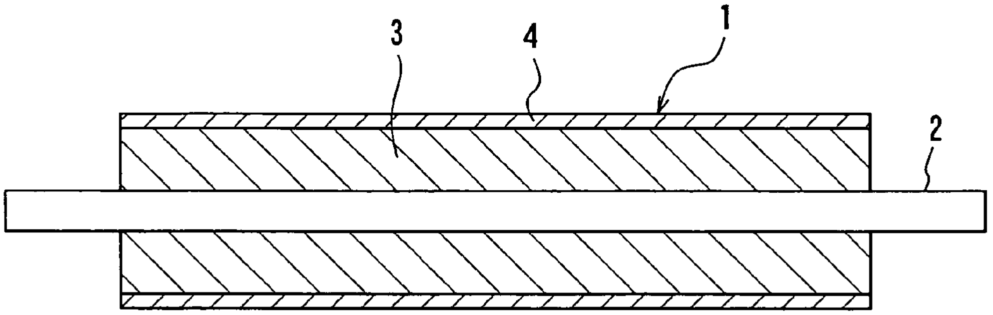
F/G. 2
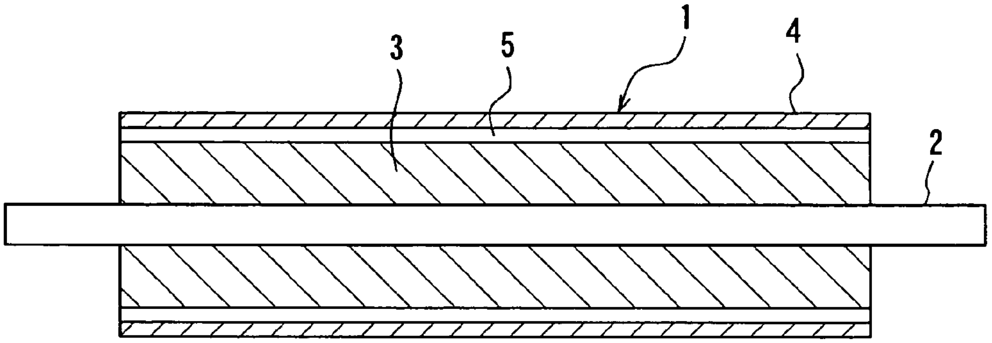
F/G. 3
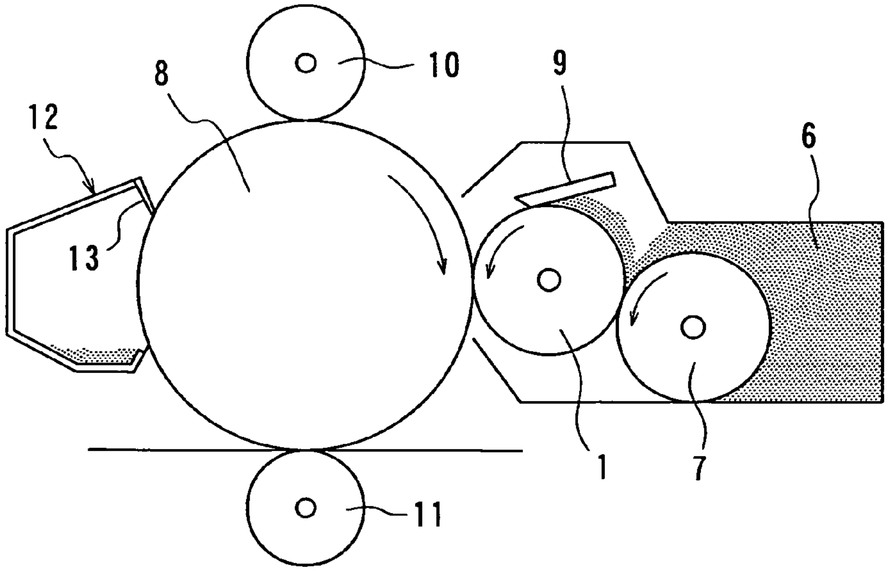

DEVELOPING ROLLER AND IMAGING APPARATUS COMPRISING THE SAME

BACKGROUND OF THE INVENTION

1. Technical Field

This invention relates to a developing roller and an imaging apparatus comprising the same, and more particularly to a developing roller having a low compression permanent strain and an excellent resistance to toner fusion in use under high temperature, high humidity environment for a long time and an imaging apparatus comprising such a developing roller and capable of forming a good image.

2. Related Art

In the imaging apparatus of an electrophotographic system such as a copier, a printer or the like, a pressurized developing process is known as a developing method wherein a toner is supplied to a photosensitive drum keeping a latent image to visualize the latent image through the toner attached to the latent image on the photosensitive drum. In such a pressurized developing process, the photosensitive drum is charged, for example, to a certain potential and then an electrostatic latent image is formed on the photosensitive drum through a photolithography machine and thereafter the developing roller carried with the toner is contacted with the photosensitive drum kept with the latent image to attach the toner to the latent image on the photosensitive drum.

In the above pressurized developing process, the developing roller should be rotated while surely maintaining the closed state to the photosensitive drum, so that it has a structure that a semiconductive elastic layer made of a semiconductive elastomer, which is obtained by dispersing carbon black or metal powder into an elastomer such as polyurethane, silicone rubber, acrylonitrile-butadiene rubber (NBR), ethylene-propylene-diene rubber (EPDM), epichlorohydrin rubber (ECO) or the like, or a foamed body thereof is formed on an outer periphery of a shaft made from a good electrical conductive material such as a metal or the like. Also, a surface coating layer may be further formed on the surface of the elastic layer for the purpose of controlling a charging characteristic or adhesion property to the toner, preventing contamination of the photosensitive drum due to the elastic layer and the like.

Recently, imaging apparatuses using a low melting point toner are increasing with the advancement of colorization, high speed performance, high-quality picture and energy-saving in the imaging apparatus. When the low melting point toner is used, such a toner is damaged by repeatedly subjecting to compression or friction between the constitutional members to cause aggregation, fusing or the like of the toner, whereby a poor imaging such as fogging or the like is easily caused. That is, the toner is deteriorated at the time of ending the service life of the toner cartridge to make the charging characteristic non-uniform, so that there is caused a problem that the poor imaging is caused or the service life becomes short. Therefore, a low hardness developing roller hardly giving the damage to the toner is demanded, and there are known a developing roller in which a substrate (elastic layer) is softened (JP-A-2003-15404) and a developing roller in which a coated film (surface coating layer) is softened by compounding an adipic acid ester compound as a plasticizer (JP-A-2005-128067).

On the other hand, when the low hardness developing roller is used in the imaging apparatus, there is a problem that traces due to the pressing of the photosensitive drum, blade, feed roller or the like is easily caused on the surface of the developing roller. For this end, it is demanded to provide developing rollers having not only a low hardness but also a low compression permanent strain in recent years. However, materials having a low hardness tends to increase the compression permanent strain, so that it is very difficult to balance both the hardness and the compression permanent strain at a sufficiently low level (see JP-A-H08-190263, JP-A-2001-75354 and JP-A-2004-67726). Also, when the coated film compounded with t he adipic acid ester compound as a plasticizer is used, the coated film becomes soft, but there is caused a problem that the compression permanent strain becomes large but also the fusing of the toner is caused in the use under a high temperature, high humidity environment over a long time to produce vertical strips in the image.

SUMMARY OF THE INVENTION

It is, therefore, an object of the invention to solve the aforementioned problems of the conventional techniques and to provide a developing roller having particularly a low compression permanent strain and an excellent resistance to toner fusion in use under high temperature, high humidity environment for a long time. Also, it is another object of the invention to provide an imaging apparatus comprising such a developing roller and capable of stably forming a good image without causing the poor imaging such as fogging or the like.

The inventors have made various studies in order to achieve the above objects and found that in the developing roller provided with the surface coating layer, a urethane resin obtained by crosslinking a lactone-modified polyol with a polyisocyanate is used in the surface coating layer, whereby the hardness and compression permanent strain of the developing roller are made sufficiently low to hardly deteriorate the toner and also the resistance to toner fusion in use under high temperature, high humidity environment for a long time can be improved, and further a good image can be stably formed by assembling such a developing roller into the imaging apparatus.

That is, the developing roller according to the invention lies in a developing roller comprising a shaft, an elastic layer formed on an outer periphery of the shaft and a surface coating layer formed on an outer peripheral face of the elastic layer, in which the surface coating layer comprises a urethane resin formed by crosslinking a lactone-modified polyol with a polyisocyanate.

In a preferable embodiment of the developing roller of the invention, the lactone-modified polyol has a number average molecular weight (Mn) converted to polystyrene of 1000-5000 as measured through a gel permeation chromatography and a molecular weight distribution (Mw/Mn) represented by a ratio of weight average molecular weight (Mw) to number average molecular weight (Mn) converted to polystyrene of not more than 2.5 as measured through the gel permeation chromatography.

In another preferable embodiment of the developing roller of the invention, the urethane resin is formed by crosslinking the lactone-modified polyol with at least two kinds of polyisocyanates. In this case, the polyisocyanate is preferable to contain at least one of isocyanurate-modified hexamethylene diisocyanate or isophorone diisocyanate.

In the other preferable embodiment of the developing roller of the invention, the lactone-modified polyol has a molar ratio ([NCO]/[OH]) of isocyanate group (NCO) of the polyisocyanate to hydroxyl group (OH) of 1.0-2.5.

In a further preferable embodiment of the developing roller of the invention, the surface coating layer has a storage modulus (E') at 25° C. of 3-50 MPa.

In a further preferable embodiment of the developing roller of the invention, the surface coating layer has a thickness of not more than 30 μm.

In a further preferable embodiment of the developing roller of the invention, the urethane resin of the surface coating layer has a structure that a silicone having a siloxane bond is introduced into a resin skeleton. In this case, the urethane resin has a structure that a silicone having a siloxane bond and a hydroxyl group or an amino group in its both terminals is introduced into a urethane portion. Further, it is preferable that a number average molecular weight of the silicone introduced into the resin skeleton is 500-10000.

In a further preferable embodiment of the developing roller of the invention, the urethane resin of the surface coating layer is an acrylurethane resin formed by crosslinking a lactone-modified polyol with a polyisocyanate. In this case, the acrylurethane resin is preferable to have a structure that a silicone having a siloxane bond and a methacryloxy group in its one terminal is introduced into an acryl portion. Further, the acrylurethane resin is preferable to have a structure that the lactone-modified polyol is introduced into a urethane portion.

In a further preferable embodiment of the developing roller of the invention, the surface coating layer contains 5-35 parts by mass of carbon black per 100 parts by mass of the lactone-modified polyol.

In a further preferable embodiment of the developing roller of the invention, the surface coating layer further contains an electrically conducting agent.

In a further preferable embodiment of the developing roller of the invention, the elastic layer is made of a urethane foam obtained by foaming a urethane starting material with mechanical stirring. In this case, the urethane foam constituting the elastic layer is preferable to have closed cells.

In a further preferable embodiment of the developing roller of the invention, a middle coating layer made from a mixed solution of a polymer and an aqueous solvent is formed between the urethane foam as the elastic layer and the surface coating layer.

In a further preferable embodiment of the developing roller of the invention, the middle coating layer is made of an acrylic resin, a urethane resin or a rubber latex.

In a further preferable embodiment of the developing roller of the invention, the middle coating layer has a glass transition temperature of not higher than 10° C.

In a further preferable embodiment of the developing roller of the invention, the middle coating layer is constituted from two or more layers.

In a further preferable embodiment of the developing roller of the invention, the middle coating layer further contains an electrically conducting agent.

In a further preferable embodiment of the developing roller of the invention, a total thickness of the middle coating layer and the surface coating layer is not more than 100 μm.

In a further preferable embodiment of the developing roller of the invention, the roller has a 10-point average surface roughness (Rz) of not more than 10 μm.

Also, the imaging apparatus according to the invention is characterized by comprising the aforementioned developing roller.

According to the invention, there can be provided a developing roller having a low compression permanent strain and an excellent resistance to toner fusion in use under high temperature, high humidity environment for a long time without contaminating a photosensitive drum and deteriorating a toner by using as a surface coating layer the urethane resin formed by crosslinking a lactone-modified polyol with a polyisocyanate. Also, there can be provided an imaging apparatus comprising such a developing roller and capable of stably forming a good image.

BRIEF DESCRIPTION OF THE DRAWINGS

The invention will be described with reference to the accompanying drawings, wherein:

FIG. 1 is a diagrammatically section view of an embodiment of the developing roller according to the invention;

FIG. 2 is a diagrammatically section view of another embodiment of the developing roller according to the invention; and FIG. 3 is a schematic view partly shown in section of an embodiment of the imaging apparatus according to the invention.

DETAILED DESCRIPTION OF THE INVENTION

<Developing Roller>

The developing roller according to the invention is explained in detail with reference to the drawings below. FIG. 1 is a diagrammatically section view of an embodiment of the developing roller according to the invention. The illustrated developing roller 1 comprises a shaft 2, an elastic layer 3 formed on an outer periphery of the shaft 2 and a surface coating layer 4 formed on an outer peripheral surface of the elastic layer 3. In the illustrated embodiment, the surface coating layer 4 is constituted from one layer, but the surface coating layer 4 in the developing roller according to the invention may be constituted from two or more layers. In the developing roller according to the invention, the surface coating layer 4 is arranged on the outer periphery of the elastic layer 3, so that the contamination of the photosensitive drum due to the contaminating substance soaked out from the elastic layer 3 can be prevented sufficiently.

The shaft 2 in the developing roller of the invention is not particularly limited, but may include, for example, a solid core of a metal such as iron, stainless steel, aluminum or the like, a hollow cylindrical shaft of a metal, a shaft of a good electrical conductive plastic and so on.

The elastic layer 3 in the developing roller of the invention is made of an elastomer and can contain other components such as an electrically conducting agent and the like, if necessary. As the elastomer used in the elastic layer 3 are mentioned polyurethane, silicone rubber, ethylene-propylene-diene rubber (EPDM), acrylonitrile-butadiene rubber (NBR), natural rubber, styrene-butadiene rubber (SBR), butadiene rubber, isoprene rubber, polynorbornene rubber, butyl rubber, chloroprene rubber, acryl rubber, epichlorohydrin rubber (ECO), ethylene-vinyl acetate copolymer (EVA), a mixture thereof and the like. Among them, polyurethane is preferable. As the elastic layer 3 may be used a non-foamed body of the elastomer, but it is preferable to use a foamed body of the elastomer by chemically foaming the elastomer with a foaming agent, or by mechanically blowing air as in the polyurethane foam, and the like. When the elastic layer 3 is made of the foamed body, it is preferable that the expansion ratio is within a range of 1.1-30 times and the density is within a range of 0.05-0.9 g/cm$^3$.

Particularly, it is preferable to use a urethane foam obtained by foaming the urethane raw material with mechanical stirring, or a urethane foam obtained by a mechanical frothing process in the elastic layer 3. The urethane foam is produced by a method wherein the urethane raw material is mechanically stirred without using the foaming agent to incorporate bubbles thereinto. As the urethane raw material are mentioned polyol and polyisocyanate, or a urethane prepolymer synthesized from polyol and polyisocyanate, and a chain extender, and a catalyst, a foam stabilizer, an electrically conducting agent and the like may be further added to the urethane raw material. Also, the bubbles in the urethane foam are mainly closed cells, and the expansion ratio and density can be properly adjusted by a method of blowing air.

As the polyol usable as the raw material for the urethane foam are mentioned polyester polyol, polyether polyol, polytetramethylene glycol, polybutadiene polyol, propylene oxide (PO)-modified polybutadiene polyol, polyisoprene polyol and the like. Moreover, the polyester polyol is obtained from a polyhydric alcohol such as ethylene glycol, diethylene glycol, 1,4-butane diol, 1,6-hexane diol, propylene glycol, trimethylol ethane, trimethlol propane or the like and a polybasic carboxylic acid such as adipic acid, glutaric acid, succinic acid, sebacic acid, pimelic acid, suberic acid or the like. Also, the polyether polyol is obtained by adding an alkylene oxide such as ethylene oxide, propylene oxide or the like to a polyhydric alcohol such as ethylene glycol, propylene glycol, glycerin or the like.

As the polyisocyanate usable as the raw material for the urethane foam are mentioned tolylene diisocyanate (TDI), diphemylmethane diisocyanate (MDI), crude diphenylmethane diisocyanate (crude-MDI), isophorone diisocyanate (IPDI), hydrogenated diphenylmethane diisocyanate, hydrogenated tolylene diisocyanate, hexamethylene diisocyanate (HDI), and an isocyanurate-modified product, a carbodiimide-modified product or a glycol-modified product thereof. The amount of the polyisocyanate used is preferable to be properly selected so that a ratio (NCO/OH) of isocyanate group (NCO) of the polyisocyanate to hydroxyl group (OH) of the polyol is within a range of 95/100-110/100.

The polyisocyanate may be reacted with the polyol by a one-shot process, or may be previously reacted with the polyol to form a urethane prepolymer, which may be then reacted with a chain extender or the like in the presence of a catalyst. Moreover, the content of NCO group in the synthesized urethane prepolymer is preferably within a range of 3-30% by mass, more preferably within a range of 5-15% by mass, and the amounts of the polyisocyanate and the polyol used in the synthesis of the urethane prepolymer are preferable to be properly selected so that the content of NCO group in the urethane prepolymer is within the above range. Further, the chain extender is a compound connecting the urethane prepolymers to each other and includes ethylene glycol, propylene glycol, butane diol, pentane diol, hexane diol, octane diol, trimethylol propane, polyether polyol, polytetramethylene glycol, polybutadiene polyol, polyisoprene polyol and the like. The amount of the chain extender used is preferable to be properly selected so that a ratio (NCO/OH) of isocyanate group (NCO) in the urethane prepolymer to hydroxyl group (OH) in the chain extender is within a range of 95/100-110/100.

The catalyst usable as the raw material for the urethane foam is a catalyst for the urethane forming reaction and includes an organotin compound such as dibutyltin laurate, dibutyltin diacetate, dibutyltin thiocarboxylate, dibutyltin dimaleate, dioctyltin thiocarboxylate, tin octenate or the like; an organolead compound such as lead octenate or the like; a monoamine such as triethylamine, dimethylcyclohexylamine or the like; a diamine such as tetramethylethylene diamine, tetramethylpropane diamine, tetramethylhexane diamine or the like; a triamine such as pentamethyldiethylene triamine, pentamethyldipropylene triamine, tetramethylguanidine or the like; a cyclic amine such as triethylene diamine, dimethyl piperazine, methylethyl piperazine, methylmorpholine, dimethylaminoethyl morpholine, dimethyl imidazole or the like; an alcoholamine such as dimethylamino ethanol, dimethylaminoethoxy ethanol, trimethylaminoethyl ethanolamine, methylhydroxyethyl piperadine, hydroxyethyl morpholine or the like; an etheramine such as bis(dimethylaminoethyl) ether, ethylene glycol bis(dimethyl)aminopropyl ether or the like, and so on. Among them, the organotin compound is preferable. These catalysts may be used alone or in a combination of two or more. The amount of the catalyst used is preferably within a range of 0.001-2.0 parts by mass per 100 parts by mass of the polyol or urethane prepolymer.

The foam stabilizer usable as the raw material for the urethane foam may include an ionic surfactant, a nionic surfactant and the like in addition to a silicone-based foam stabilizer such as a polyether-modified silicone oil or the like. The amount of the foam stabilizer used is preferably within a range of 0.5-5.0 parts by mass per 100 parts by mass of the polyol or urethane prepolymer.

The electrically conducting agent usable in the elastic layer 3 includes an electron conductive agent, an ion conductive agent and the like. As the electron conductive agent are mentioned an electrically conductive carbon such as Ketjenbalck, acetyleneblack or the like; carbon blacks for rubber of SAF, ISAF, HAF, FEF, GPF, SRF, FT, MT and the like; a carbon black for color subjected to an oxidation treatment, a thermally decomposed carbon black, a natural graphite, an artificial graphite, an antimony-doped tin oxide, ITO; a metal oxide such as tin oxide, titanium oxide, zinc oxide or the like; a metal such as nickel, copper, silver, germanium or the like; an electrically conductive polymer such as polyaniline, polypyrrole, polyacetylene or the like; an electrically conductive whisker such as carbon whisker, graphite whisker, titanium carbide whisker, electrically conductive potassium titanate whisker, electrically conductive barium titanate whisker, electrically conductive titanium oxide whisker, electrically conductive zinc oxide whisker or the like; and so on. The amount of the electron conductive agent compounded is preferably a range of 1-50 parts by mass per 100 parts by mass of the elastomer, more preferably a range of 5-40 parts by mass.

As the ion conductive agent are mentioned a perchlorate, a chlorate, a hydrochloride, a bromate, an iodate, a fluoroborate, a sulfate, an ethylsulfate, a carboxylate, a sulfonate or the like of tetraethylammonium, tetrabutylammonium, dodecyltrimethylammonium, hexadecyltrimethylammonium, benzyltrimethylammonium, modified aliphatic acid dimethylethylammonium or the like; a perchlorate, a chlorate, a hydrochloride, a bromate, an iodate, a fluoroborate, a sulfate, a trifluoromethylsulfate, a sulfonate or the like of an alkali or alkaline earth metal such as lithium, sodium, potassium, calcium, magnesium or the like. The amount of the ion conductive agent compounded is preferably a range of 0.01-10 parts by mass per 100 parts by mass of the elastomer, more preferably a range of 0.05-5 parts by mass. The electrically conducting agents may be used alone or in a combination of two or more, or in a combination of electron conductive agent and ion conductive agent.

The elastic layer 3 is preferable to have a resistance value of $10^3$-$10^{10}$ Ωcm, preferably $10^4$-$10^8$ Ωcm by compounding the electrically conducting agent. When the resistance value of the elastic layer 3 is less than $10^3$ Ωcm, electric charge may leak to the photosensitive drum or the like, or the developing roller itself may be broken by a voltage, while when it exceeds $10^{10}$ Ωcm, the fogging is easily caused.

The elastic layer 3 may contain a crosslinking agent such as an organic peroxide or the like, and a vulcanizing agent such as sulfur or the like for the purpose of rendering the elastomer into a rubbery substance, if necessary, and may further contain a vulcanizing assistant, a vulcanization accelerator, an accelerator activator, a retarder and the like. Also, the elastic layer 3 may contain compounding ingredients for rubber such as a filler, a peptizer, a blowing agent, a pasticizer, a softening agent, a tackifier, an anti-tack agent, a release agent, a bulking agent, a coloring agent and the like.

In the developing roller according to the invention, the surface coating layer 4 is characterized by comprising a urethane resin formed by crosslinking a lactone-modified polyol with a polyisocyanate. Since the surface coating layer 4 comprises the above urethane resin, the hardness of the developing roller is lowered so as not to give the damage to the toner, and further it is possible to reduce the compression permanent strain to form the good image.

The surface coating layer 4 of the developing roller of the invention mainly comprises the urethane resin formed by crosslinking the lactone-modified polyol with the polyisocyanate and may contain other ingredients such as electrically conducting agent and the like, if necessary. The lactone-modified polyol can be produced by modifying a terminal of the polyol with a lactone such as ϵ-caprolactone or the like, and also commercially available ones may be used. In the invention, the lactone-modified polyol is preferable to have a number average molecular weight (Mn) converted to polystyrene of 1000-5000 as measured through a gel permeation chromatography and a molecular weight distribution (Mw/Mn) represented by a ratio of weight average molecular weight (Mw) to number average molecular weight (Mn) converted to polystyrene of not more than 2.5 a measured through the gel permeation chromatography. When the number average molecular weight (Mn) of the lactone-modified polyol is less than 1000, the hardness of the developing roller increases and there may be caused a fear of deteriorating the resistance to toner fusion in use under high temperature, high humidity environment for a long time, while when it exceeds 5000, the crosslinking degree lowers and there may be caused a fear of increasing the compression permanent strain. Further, when the molecular weight distribution (Mw/Mn) exceeds 2.5, the compression permanent strain increases and the resistance to toner fusion is deteriorated and the fogging is easily caused. From a viewpoint of the simultaneous establishment between the low compression permanent strain and the excellent resistance to toner fusion, the number average molecular weight (Mn) of the lactone-modified polyol is preferably 1000-3000 and the molecular weight distribution (Mw/Mn) is preferably not more than 2.0. Furthermore, the lactone-modified polyol is preferable to have a weight average molecular weight (Mw) of not less than 500, preferably not less than 1000.

As the polyol to be modified with the lactone are mentioned a polyether polyol obtained by addition-polymerizing an alkylene oxide such as ethylene oxide, propylene oxide or the like to glycerin or the like, polytetramethylene glycol, glycerin, ethylene glycol, propylene glycol, butane diol, pentane diol, hexane diol, octane diol, polybutadiene polyol, polyisoprene polyol, polyester polyol and so on.

As the polyisocyanate crosslinking the lactone-modified polyol are mentioned tolylene diisocyanate (TDI), diphenylmethane diisocyanate (MDI), crude diphenylmethane diisocyanate (crude-MDI), isophorone diisocyanate (IPDI), hydrogenated diphenylmethane diisocyanate, hydrogenated tolylene diisocyanate, hexamethylene diisocyanate (HDI), an isocyanurate-modified hexamethylene diisocyanate and the like. These polyisocyanates may be used alone, but it is preferable to use a combination of two or more polyisocyanates. Moreover, from a viewpoint of the simultaneous establishment between the low hardness and low compression permanent strain in the surface coating layer, it is preferable that the polyisocyanate used in the invention contains at least one of isocyanurate-modified hexamethylene diisocyanate and isophorone diisocyanate.

The surface coating layer 4 may further contain a catalyst for promoting the crosslinking reaction between the lactone-modified polyol and the polyisocyanate. As the catalyst, mention may be made of an organotin compound such as dibutyltin dilaurate, dibutyltin diacetate, dibutyltin thiocarboxylate, dibutyltin dimaleate, dioctyltin carboxylate, tin octanoate or the like; an organolead compound such as lead octanoate or the like; a monoamine such as triethylamine, dimethylcyclohexylamine or the like; a diamine such as tetramethylethylene diamine, tetramethylpropane diamine, tetrasmethylhexane diamine or the like; a triamine such as pentamethyldiethylene triamine, pentamethyldipropylene triamine, tetramethyl guanidine or the like; a cyclic amine such as triethylene diamine, dimethyl piperazine, methylmorpholine, dimethylaminoethyl morpholine, dimethyl imidazole or the like; an alcoholamine such as dimethylamino ethanol, dimethylaminoethoxy ethanol, trimethylaminoethyl ethanolamine, methylhydroxyethyl piperazine, hydroxyethyl morpholine or the like; an etheramine such as bis(dimethylaminoethyl) ether, ethylene glycol bis(dimethyl) aminopropyl ether or the like; and so on. Among these catalysts, the organotin compound is preferable. These catalysts may be used alone or in a combination of two or more. The amount of the catalyst used is preferable to be within a range of 0.001-2.0 parts by mass per 100 parts by mass of the lactone-modified polyol.

In the invention, from a viewpoint of the prevention from the contamination of a photoreceptor under high temperature and high humidity condition, it is preferable that a molar ratio ([NCO]/[OH]) of isocyanate group (NCO) of the isocyanate compound to hydroxyl group (OH) of the lactone-modified polyol is 1.0-2.5, more preferably 1.2-2.0.

The surface coating layer 4 may be compounded with an electrically conducting agent for the purpose of controlling the electric conductivity. As the electrically conducting agent may be mentioned the same electrically conducting agents as used in the elastic layer 3. The amount of the electrically conducting agent compounded in the surface coating layer 4 is preferably not more than 20 parts by mass, more preferably 0.01-20 parts by mass, further preferably 1-10 parts by mass per 100 parts by mass of the urethane resin constituting the surface coating layer 4 in case of the ion conductive agent, and preferably 1-70 parts by mass, more preferably 5-50 parts by mass per 100 parts by mass of the urethane resin constituting the surface coating layer 4 in case of the electron conductive agent. In the invention, carbon black is used as an electrically conducting agent from a viewpoint of the stability of the electric conductivity under various environments, in which the amount of carbon black compounded is preferably 5-35 parts by mass, more preferably 10-30 parts by mass per 100 parts by mass of the lactone-modified polyol. In the surface coating layer 4, it is preferable that the volume resistance value is adjusted by the addition of the electrically conducting agent to a range of $10^3$-$10^{10}$ Ω·cm, preferably $10^4$-$10^8$ Ω·cm.

In the invention, the storage modulus at 25° C. of the surface coating layer 4 is preferably 3-50 MPa, more preferably 5-40 MPa from a viewpoint that the hardness of the surface coating layer is made low to prevent the damaging of the toner.

The thickness of the surface coating layer 4 is not particularly limited, but is preferably not more than 30 μm, more preferably 1-15 μm. When the thickness of the surface coating layer 4 exceeds 30 μm, the surface coating layer 4 becomes harder to damage the flexibility, and also the durability is deteriorated to cause cracking and there is a fear that the toner is damaged to cause the adhesion of the toner to the photosensitive drum or the stratification blade to thereby cause the poor imaging.

As the urethane resin used in the surface coating layer 4 may be used an acrylurethane resin. In this case, silicone having a siloxane bond may be introduced into a urethane portion and/or an acryl portion. As the silicone introduced into the urethane portion of the urethane resin and/or the acrylurethane resin is preferable a silicone having a siloxane bond and a hydroxyl group or an amino group at both terminals, and as the silicone introduced into the acryl portion of the acrylurethane resin is preferable a silicone having a siloxane bond and a methacryloxy group at its one terminal. Also, the silicon introduced into the resin skeleton of the urethane resin and/or the acrylurethane resin is preferable to have a number average molecular weight (Mn) of 500-10,000. Moreover, the content of the silicon having the siloxane bond in the urethane resin and the acrylurethane resin is preferable to be a range of 5-40% by mass. When the content of the silicone is less than 5% by mass, the effect of reducing the friction resistance of the surface coating layer 4 to improve the slippage property of the developing roller becomes smaller, while when it exceeds 40% by mass, the cost becomes higher.

The acrylurethane resin may have a block type or graft type bond between the urethane portion and the acryl portion, but is preferable to be a type of bonding the acryl portion as a side chain to the urethane portion as a main chain. The acrylurethane resin can be produced by reacting a polymer, which is formed by introducing a hydroxyl group into an acryl polymer with 2-hydroxypropyl(metha)acrylater, 2-hydroxyethyl (metha)acrylate or the like, with a urethane prepolymer having an isocyanate group in its molecule terminal, or by radical-polymerizing a urethane prepolymer having a mercapto group at its terminal or a side chain with (metha)acrylate in the presence of a peroxide. In the latter case, the mercapto group generates radicals through the peroxide and the (metha)acrylate is radical-polymerized at the radicals as a base point. In the invention, the acrylurethane resin in which the lactone-modified polyol and the silicon having the siloxane bond are introducted into the urethane portion is obtained by using the urethane prepolymer synthesized from the lactone-modified polyol, the polyisocyanate and the silicone having the siloxane bond and the hydroxyl group or amino group at its both terminals. Also, the acrylurethane resin introduced with the silicone having the siloxane bond in the acryl portion is obtained by using the silicone having the siloxane bond and the methacryloxy group at its one terminal in the synthesis of the above acryl polymer. On the other hand, the urethane resin can be produced, for example, from the lactone-modified polyol, the polyisocyanate and the silicon having the siloxane bond and the hydroxyl group or amino group at its both terminals. In the developing roller according to the invention, urethane resin and/or acrylurethane resin obtained by a method other than the above methods may be used.

As the acryl component of the acrylurethane resin are mentioned (metha)acrylates such as 2-hydroxypropyl (metha)acrylate, 2-hydroxyethyl(metha)acrylate, methyl metha)acrylate, ethyl(metha)acrylate, isobutyl(metha)acrylate, n-butyl(metha)acrylate, glycidyl(metha)acrylate and the like. In the acrylurethane resin, the content of the acryl portion in the resin is preferably a range of 5-80% by mass, more preferably a range of 10-60% by mass, further preferably a range of 20-50% by mass.

The method of forming the surface coating layer 4 is not particularly limited, but there is preferably used a method wherein a coating composition for the surface coating layer 4 comprising various components is prepared and applied by a dipping process, a spray process or a roll coating process and then dried.

Particularly, when the elastic layer 3 is comprised of the urethane foam, if the coating composition comprising the raw materials for the surface coating layer 4 is applied to form the surface coating layer 4, the elastic layer 3 may be dissolved or swollen by the solvent in the coating composition. In order to prevent the dissolution or swelling of the elastic layer, it is preferable to dispose a middle coating layer between the elastic layer and the surface coating layer. In FIG. 2 is shown a diagrammatically section view of an embodiment of the developing roller according to the invention provided with such a middle coating layer. The illustrated developing roller 1 comprises a shaft 2, an elastic layer 3 formed on an outer periphery of the shaft 2, a middle coating layer 5 formed on an outer peripheral face of the elastic layer 3 and a surface coating layer 4 formed on an outer peripheral surface of the middle coating layer 5. In the illustrated embodiment, each of the middle coating layer 5 and the surface coating layer 4 is constituted from one layer, but each of the middle coating layer 5 and the surface coating layer 4 in the developing roller according to the invention may be constituted from two or more layers. In the developing roller according to the invention, the middle coating layer 5 and surface coating layer 4 are arranged on the outer periphery of the elastic layer 3, so that the contamination of the photosensitive drum due to the contaminating substance soaked out from the elastic layer 3 can be prevented sufficiently. Also, the total thickness of the middle coating layer 5 and the surface coating layer 4 is preferable to be not more than 100 μm from a viewpoint not damaging the flexibility of the elastic layer 3.

The middle coating layer 5 in the developing roller of the invention is made from a mixed solution of a polymer and an aqueous solvent. As the polymer may be used resins and rubber as far as they can be dissolved or dispersed in water. Moreover, the middle coating layer 5 is preferable to have a glass transition temperature of not higher than 10° C. and a thickness of not more than 100 μm.

When the polymer used in the formation of the middle coating layer 5 is a resin, the middle coating layer 5 can be formed, for example, by preparing a mixed solution comprising the resin and water and applying the mixed solution onto the elastic layer 3 through a dipping process or a spry process and then drying. As the resin used in the middle coating layer 5 is preferable an aqueous resin. The aqueous resin may be any types such as water-soluble type, emulsion type, suspension type and the like, and an aqueous resin having an active hydrogen such as carboxyl group, hydroxyl group, amino group or the like is preferable. As the aqueous resin are mentioned warm water-soluble resins such as acrylic resin, urethane resin, polyester resin, polydioxorane and the like. Among them, the acrylic resin and urethane resin are preferable. The acrylic resin is not particularly limited, but is preferable to have a glass transition temperature of not higher than 10° C. As the acrylic resin, there are thermoplastic type, and crosslinking types such as self-crosslinking, melamine crosslinking, isocyanate crosslinking and the like, but any types may be used as far as they have the glass transition temperature of the above range, and the thermoplastic type is preferable in view of the step of forming the coated film and the hardness.

On the other hand, when the polymer used in the formation of the middle coating layer 5 is rubber, the middle coating layer can be formed, for example, by applying a rubber latex on the elastic layer 3 through a dipping process or the like and then coagulating the latex with a coagulating agent, or by forming a layer of a coagulating agent on the elastic layer 3 through a dipping process or the like and then applying a rubber latex thereonto and coagulating it, or the like. As a rubber component used in the middle coating layer 5 are mentioned styrene-butadiene copolymer rubber, natural rubber and the like. In the coagulation, it is preferable to use an acidic solution formed by dissolving a coagulating agent such as Kolatex 93 (trade name, made by Kawaguchi Kagaku Kogyo Co., Ltd.) or the like in water or methanol. The latex is gelated and coagulated by causing the acid-alkali reaction between the alkaline latex and the acidic solution. In the formation of the middle coating layer 5 from the rubber latex, the drying step for removing water produced by the acid-alkali reaction or the washing step for removing a salt produced by the acid-alkali reaction can be properly conducted.

The electric conductivity of the middle coating layer 5 can be adjusted by adding an electrically conducting agent likewise the elastic layer 3. In this case, the electrically conducting agent is added so that the volume resistivity of the middle coating layer 5 is within a range of $10^3$-$10^{10}$ Ω·cm, preferably $10^4$-$10^8$ Ω·cm. As the electrically conducting agent added to the middle coating layer 5 may be exemplified the same electrically conducting agents as used in the raw material for the urethane foam constituting the elastic layer 3. The amount of the electrically conducting agent added in the middle coating layer 5 is preferably a range of 0.1-20 parts by mass, more preferably a range of 1-10 parts by mass per 100 parts by mass of the polymer.

To the middle coating layer 5 may be added a proper amount of an additive such as a thickener, a thixotropic agent, a structural viscosity modifier or the like, if necessary.

The developing roller according to the invention is preferable to have a surface roughness of not more than 10 μm as a 10 point average roughness (Rz). When the 10 point average roughness (Rz) of the developing roller exceeds 10 μm, there is a tendency of increasing the delivery amount of the toner, but the charged amount of the toner is lacking and hence the fogging or poor graduation is caused in the image.

The resistance value of the developing roller according to the invention is not particularly limited, but the electric resistance for obtaining the good image is preferably $10^3$-$10^{10}$Ω, more preferably $10^4$-$10^8$Ω. When the resistance value of the developing roller is less than $10^3$Ω, the control of the graduation is considerably difficult and if a defect is existent in the photosensitive drum, the bias leak may be caused. While, when the resistance value exceeds $10^{10}$Ω, if the toner is developed on the photosensitive drum, the voltage drop of the development bias is caused due to the high resistance of the developing roller and hence the development bias enough to conduct the development can not be ensured and the satisfactory imaging concentration is not obtained. Moreover, the resistance value can be measured from a current value when the outer peripheral face of the developing roller is pushed onto a flat or cylindrical opposed electrode and a voltage of 100 V is applied between the shaft and the opposed electrode. Thus, the field strength for moving the toner can be maintained adequately and uniformly by properly uniformly controlling the resistance value of the developing roller.

The developing roller according to the invention is preferable to have an Asker C hardness of not more than 60°. When the low hardness developing roller having an Asker C hardness of not more than 60° is assembled into the imaging apparatus, the damage of the toner is prevented among the developing roller, the photosensitive drum, the blade, the toner feeding roller and the like, whereby the sufficiently good image can be formed.

<Imaging Apparatus>

The imaging apparatus according to the invention is characterized by comprising the aforementioned developing roller which has a low compression permanent strain without contaminating the photosensitive drum and deteriorating the toner, and can stably form the good image without causing the poor imaging such as fogging or the like. The imaging apparatus is not particularly limited except for the use of the above developing roller and can be manufactured by a well-known method.

The imaging apparatus according to the invention will be described in detail with reference to the drawing below. FIG. 3 is a partial section view of an embodiment of the imaging apparatus according to the invention. The illustrated imaging apparatus comprises a toner feed roller 7 for feeding toners 6, a photosensitive drum 8 keeping an electrostatic latent image, the aforementioned developing roller 1 disposed between the toner feed roller 7 and the photosensitive drum 8, a stratification blade 9 disposed in the vicinity of the developing roller 1 (upper part in the figure), a charged roller 10 located in the vicinity of the photosensitive drum 8 (upper part in the figure), a transfer roller 11 located in the vicinity of the photosensitive drum 8 (lower part in the figure) and a cleaning section 12 disposed adjacent to the photosensitive drum 8. Moreover, the imaging apparatus according to the invention may be further provided with known parts (not shown) usually used in the imaging apparatus.

In the illustrated imaging apparatus, the photosensitive drum is charged to a constant potential by the charged roller 10 and thereafter an electrostatic latent image is formed on the photosensitive drum 8 through a photolithography machine (not shown). Then, the toners 6 existing on the toner feed roller 7 are transferred through the developing roller 1 to the photosensitive drum 8 by rotating the toner feed roller 7, the developing roller 1 and the photosensitive drum 8 in an arrow direction. The toners 6 on the developing roller 1 are aligned to a uniform thin layer by the stratification blade 9, and then the toners 6 are attached from the developing roller 1 to the electrostatic latent image on the photosensitive drum 8 by rotating the developing roller 1 and the photosensitive drum 8 while contacting with each other to thereby visualize the latent image. The toners 6 attached to the latent image are transferred to a recording medium such as a paper or the like through the transfer roller 11, while the toners 6 retaining on the photosensitive drum 8 after the transfer are removed by a cleaning blade 13 in the cleaning section 12. In the imaging apparatus according to the invention, it is possible to stably form a good image by using the developing roller according to the invention having a low compression permanent strain without contaminating the photosensitive drum and deteriorating the toner as the developing roller 1.

The following examples are given in illustration of the invention and are not intended as limitations thereof.

(Preparation of Roller Body)

A urethane prepolymer dispersing acetylene black therein is prepared by mixing 100 parts by mass of a urethane prepolymer synthesized from tolylene diisocyanate (TDI) and a polyether polyol with 2 parts by mass of acetylene black as a component A. On the other hand, 30 parts by mass of a polyether polyol and 0.1 part by mass of sodium perchlorate ($NaClO_4$) are mixed while heating at 70° C. and further mixed with 4.5 parts by mass of a polyether-modified silicone oil (foam stabilizer) and 0.2 part by mass of dibutyltin dilaurate (catalyst) to form a mixture as a component B. Next, the component A and the component B are foamed by a mechanical froth process and poured into a cylindrical mold set with a core therein and then RIM shaping is conducted to a prepare a roller body having an elastic layer made of a polyurethane foam.

EXAMPLE 1

A coating composition for a surface coating layer is prepared by dispersing 100 parts by mass of a caprolactone-modified polyol (PCL205 made by Daicel Chemical Industries, Ltd. Molecular weight: 500), 35 parts by mass of carbon black and 50 parts by mass of a cyanurate-modified HDI (Coronate HX made by Nippon Polyurethane Industry Co., Ltd.) into 300 parts by mass of methylethyl ketone (MEK). The thus obtained coating composition is applied onto an outer periphery of the roller body having the elastic layer made of the polyurethane foam to form a surface coating layer to thereby prepare a developing roller. Then, the roller resistance, 10 point average roughness (Rz), Asker C hardness and toner charging property of the thus obtained developing roller are evaluated by known methods. Further, the imaging property is evaluated by assembling the developing roller in a laser printer to conduct the printing. Also, the developing roller is assembled in a cartridge and kept under environment of 50° C. and 90% RH, and thereafter the presence or absence of contamination on the photosensitive drum and the presence or absence of trace due to the pressing of the blade on the developing roller are measured. The results are shown in Table 1.

EXAMPLE 2

A coating composition for a surface coating layer is prepared by dispersing 100 parts by mass of a caprolactone-modified polyol (PCL210N, made by Daicel Chemical Industries, Ltd. Molecular weight: 1000), 35 parts by mass of carbon black and 50 parts by mass of a cyanurate-modified HDI (Coronate HX made by Nippon Polyurethane Industry Co., Ltd.) into 300 parts by mass of MEK. A developing roller is prepared by using the thus obtained coating composition instead of the coating composition prepared in Example 1 and then evaluated. The results are shown in Table 1.

EXAMPLE 3

A coating composition for a surface coating layer is prepared by dispersing 100 parts by mass of a caprolactone-modified polyol (PCL220, made by Daicel Chemical Industries, Ltd. Molecular weight: 2000), 35 parts by mass of carbon black and 50 parts by mass of a cyanurate-modified HDI (Coronate HX made by Nippon Polyurethane Industry Co., Ltd.) into 300 parts by mass of MEK. A developing roller is prepared by using the thus obtained coating composition instead of the coating composition prepared in Example 1 and then evaluated. The results are shown in Table 1.

EXAMPLE 4

A coating composition for a surface coating layer is prepared by dispersing 100 parts by mass of a caprolactone-modified polyol (PCL312, made by Daicel Chemical Industries, Ltd. Molecular weight: 1200), 35 parts by mass of carbon black and 50 parts by mass of a cyanurate-modified HDI (Coronate HX made by Nippon Polyurethane Industry Co., Ltd.) into 300 parts by mass of MEK. A developing roller is prepared by using the thus obtained coating composition instead of the coating composition prepared in Example 1 and then evaluated. The results are shown in Table 1.

COMPARATIVE EXAMPLE 1

A coating composition for a surface coating layer is prepared by dispersing 100 parts by mass of a polycarbonate diol-modified polyurethane paint (N5196, made by Nippon Polyurethane Industry Co., Ltd.), 35 parts by mass of carbon black and 50 parts by mass of a cyanurate-modified HDI (Coronate HX made by Nippon Polyurethane Industry Co., Ltd.) into 300 parts by mass of MEK. A developing roller is prepared by using the thus obtained coating composition instead of the coating composition prepared in Example 1 and then evaluated. The results are shown in Table 1.

COMPARATIVE EXAMPLE 2

A coating composition for a surface coating layer is prepared by dispersing 100 parts by mass of an adipic acid-modified polyurethane paint (N3126, made by Nippon Polyurethane Industry Co., Ltd.), 35 parts by mass of carbon black and 50 parts by mass of a cyanurate-modified HDI (Coronate HX made by Nippon Polyurethane Industry Co., Ltd.) into 300 parts by mass of MEK. A developing roller is prepared by using the thus obtained coating composition instead of the coating composition prepared in Example 1 and then evaluated. The results are shown in Table 1.

TABLE 1

| | | Example | | | | Comparative Example | |
|---|---|---|---|---|---|---|---|
| | | 1 | 2 | 3 | 4 | 1 | 2 |
| Elastic layer | Resin | Urethane foam | Urethane foam | Urethane foam | Urethane foam | Urethane foam | Urethane foam |
| Property values | Roller resistance (Ω/100 V) | $2.5 \times 10^6$ | $3.7 \times 10^6$ | $4.2 \times 10^6$ | $3.5 \times 10^6$ | $3.9 \times 10^6$ | $2.6 \times 10^6$ |
| | Rz (μm) | 5.4 | 5.2 | 6.1 | 5.7 | 5.9 | 6.5 |
| | Hardness(Asker C) | 62 | 53 | 55 | 49.2 | 48.6 | 48.8 |
| | Toner charging property | ○ | ○ | ○ | ○ | ○ | ○ |
| Imaging properties | Imaging concentration | ○ | ○ | ○ | ○ | ○ | ○ |
| | Fogging | ○ | ○ | ○ | ○ | Δ | Δ |
| | Half tone patches | ○ | ○ | ○ | ○ | slight patches | patches |
| Resistance to contamination of photosensitive drum | kept at 50° C. and 90% RH for 1 week | ○ | ○ | ○ | ○ | Δ | ○ |

TABLE 1-continued

| | Example | | | | Comparative Example | |
|---|---|---|---|---|---|---|
| | 1 | 2 | 3 | 4 | 1 | 2 |
| Resistance to trace due to pressing of blade | ○ | ○ | ○ | ○ | X | X |

○: good,
Δ: slight bad,
X: bad

As seen from Table 1, the developing rollers of the examples according to the invention can stably form the good image because the photosensitive drum is not contaminated and the compression permanent strain is low and the trace due to the pressing of the blade is not caused and the damage on the toner is small.

EXAMPLE 5

A coating composition for a surface coating layer is prepared by dispersing 100 parts by mass of a lactone-modified polyol (PCL210N, made by Daicel Chemical Industries, Ltd. Mn=1000, Mw/Mn=1.7), 30 parts by mass of carbon black and 10 parts by mass of urethane particles (Artpearl C800, made by Negami Kogyo Co., Ltd. Average particle size: 8.8 μm) into 500 parts by mass of methylethyl ketone (MEK) and adding 40 parts by mass (molar ratio [NCO]/[OH]=1.0) of an isocyanate curing agent (Coronate HX, made by Nippon Polyurethane Industry Co., Ltd. NCO %=21%) and then stirring with a stirring motor for 30 minutes. The thus obtained coating composition is applied onto the outer periphery of the roller body having the elastic layer made of the urethane foam to form a surface coating layer to thereby prepare a developing roller.

EXAMPLE 6

A coating composition for a surface coating layer is prepared by dispersing 100 parts by mass of a lactone-modified polyol (PCL230, made by Daicel Chemical Industries, Ltd. Mn=3000, Mw/Mn=2.1), 30 parts by mass of carbon black and 10 parts by mass of urethane particles (MX1000, made by Soken Kagaku Kogyo Co., Ltd. Average particle size: 10.0 μm) into 500 parts by mass of MEK and adding 15 parts by mass (molar ratio [NCO]/[OH]=1.0) of an isocyanate curing agent (Coronate HX, made by Nippon Polyurethane Industry Co., Ltd. NCO %=21%) and then stirring with a stirring motor for 30 minutes. A developing roller is prepared by using the thus obtained coating composition instead of the coating composition of Example 5.

EXAMPLE 7

A coating composition for a surface coating layer is prepared by dispersing 100 parts by mass of a lactone-modified polyol (trial PCL250B, made by Daicel Chemical Industries, Ltd. Mn=5000, Mw/Mn=2.3), 30 parts by mass of carbon black and 10 parts by mass of urethane particles (Artpearl C800, made by Negami Kogyo Co., Ltd. Average particle size: 8.8 μm) into 500 parts by mass of MEK and adding 8 parts by mass (molar ratio [NCO]/[OH]=1.0) of an isocyanate curing agent (Coronate HX, made by Nippon Polyurethane Industry Co., Ltd. NCO %=21%) and then stirring with a stirring motor for 30 minutes. A developing roller is prepared by using the thus obtained coating composition instead of the coating composition of Example 5.

EXAMPLE 8

A coating composition for a surface coating layer is prepared by dispersing 100 parts by mass of a lactone-modified polyol (trial PCL250B, made by Daicel Chemical Industries, Ltd. Mn=5000, Mw/Mn=2.3), 30 parts by mass of carbon black and 10 parts by mass of urethane particles (Vernoc CFB101-40, made by Dainippon Ink and Chemicals, Inc. Average particle size: 14 μm) into 500 parts by mass of MEK and adding 20 parts by mass (molar ratio [NCO]/[OH]=2.5) of an isocyanate curing agent (Coronate HX, made by Nippon Polyurethane Industry Co., Ltd. NCO %=21%) and then stirring with a stirring motor for 30 minutes. A developing roller is prepared by using the thus obtained coating composition instead of the coating composition of Example 5.

EXAMPLE 9

A coating composition for a surface coating layer is prepared by dispersing 100 parts by mass of a lactone-modified polyol (PCL210N, made by Daicel Chemical Industries, Ltd. Mn=1000, Mw/Mn=1.7), 30 parts by mass of carbon black and 10 parts by mass of urethane particles (Artpearl C800, made by Negami Kogyo Co., Ltd. Average particle size: 8.8 μm) into 500 parts by mass of MEK and adding 80 parts by mass (molar ratio [NCO]/[OH]=1.0) of an isocyanate curing agent (D-140N, made by Mitsui Takeda Chemicals, Co., Ltd. NCO %=10.5%) and then stirring with a stirring motor for 30 minutes. A developing roller is prepared by using the thus obtained coating composition instead of the coating composition of Example 5.

EXAMPLE 10

A coating composition for a surface coating layer is prepared by dispersing 100 parts by mass of a lactone-modified polyol (PCL230, made by Daicel Chemical Industries, Ltd. Mn=3000, Mw/Mn=2.1), 30 parts by mass of carbon black and 10 parts by mass of urethane particles (MX1000, made by Soken Kagaku Kogyo Co., Ltd. Average particle size: 10.0 μm) into 500 parts by mass of MEK and adding 30 parts by mass (molar ratio [NCO]/[OH]=1.0) of an isocyanate curing agent (D-140N, made by Mitsui Takeda Chemicals, Co., Ltd. NCO %=10.5%) and then stirring with a stirring motor for 30 minutes. A developing roller is prepared by using the thus obtained coating composition instead of the coating composition of Example 5.

EXAMPLE 11

A coating composition for a surface coating layer is prepared by dispersing 100 parts by mass of a lactone-modified polyol (trial PCL250B, made by Daicel Chemical Industries, Ltd. Mn=5000, Mw/Mn=2.3), 30 parts by mass of carbon black and 10 parts by mass of urethane particles (Artpearl C800, made by Negami Kogyo Co., Ltd. Average particle size: 8.8 μm) into 500 parts by mass of MEK and adding 16 parts by mass (molar ratio [NCO]/[OH]=1.0) of an isocyanate curing agent (D-140N, made by Mitsui Takeda Chemicals, Co., Ltd. NCO %=10.5%) and then stirring with a stirring motor for 30 minutes. A developing roller is prepared by using the thus obtained coating composition instead of the coating composition of Example 5.

EXAMPLE 12

A coating composition for a surface coating layer is prepared by dispersing 100 parts by mass of a lactone-modified polyol (trial PCL250B, made by Daicel Chemical Industries, Ltd. Mn=5000, Mw/Mn=2.3), 30 parts by mass of carbon black and 10 parts by mass of urethane particles (Vernoc CFB101-40, made by Dainippon Ink and Chemicals, Inc. Average particle size: 14 μm) into 500 parts by mass of MEK and adding 40 parts by mass (molar ratio [NCO]/[OH]=2.5) of an isocyanate curing agent (D140-N, made by Mitsui Takeda Chemicals, Co., Ltd. NCO %=10.5%) and then stirring with a stirring motor for 30 minutes. A developing roller is prepared by using the thus obtained coating composition instead of the coating composition of Example 5.

EXAMPLE 13

A coating composition for a surface coating layer is prepared by dispersing 100 parts by mass of a lactone-modified polyol (trial PCL210, made by Daicel Chemical Industries, Ltd. Mn=1000, Mw/Mn=1.9), 30 parts by mass of carbon black and 10 parts by mass of urethane particles (Artpearl C800, made by Negami Kogyo Co., Ltd. Average particle size: 8.8 μm) into 500 parts by mass of MEK and adding 108 parts by mass (molar ratio [NCO]/[OH]=2.5) of an isocyanate curing agent (Coronate HX, made by Nippon Polyurethane Industry Co., Ltd. NCO %=21%) and then stirring with a stirring motor for 30 minutes. A developing roller is prepared by using the thus obtained coating composition instead of the coating composition of Example 5.

EXAMPLE 14

A developing roller is prepared by applying a urethane emulsion paint (tiral E4000, made by Dai-ichi Kogyo Seiyaku Co., Ltd.) as a middle coating layer onto the outer periphery of the roller body having the elastic layer made of the urethane foam at a thickness of 70 μm and then applying the coating composition of Example 5 thereonto to form a surface coating layer.

COMPARATIVE EXAMPLE 3

A coating composition for a surface coating layer is prepared by dispersing 100 parts by mass of an adipate-based polyol (P-2010, made by Kuraray Co., Ltd. Mn=2000, Mw/Mn=2.2), 30 parts by mass of carbon black and 10 parts by mass of urethane particles (Artpearl C800, made by Negami Kogyo Co., Ltd. Average particle size: 8.8 μm) into 500 parts by mass of MEK and adding 30 parts by mass (molar ratio [NCO]/[OH]=1.5) of an isocyanate curing agent (Coronate HX, made by Nippon Polyurethane Industry Co., Ltd. NCO %=21%) and then stirring with a stirring motor for 30 minutes. A developing roller is prepared by using the thus obtained coating composition instead of the coating composition of Example 5.

COMPARATIVE EXAMPLE 4

A coating composition for a surface coating layer is prepared by dispersing 100 parts by mass of a lactone-modified polyol (PCL205, made by Daicel Chemical Industries, Ltd. Mn=500, Mw/Mn=1.6), 30 parts by mass of carbon black and 10 parts by mass of urethane particles (Vernoc CFB101-40, made by Dainippon Ink and Chemicals, Inc. Average particle size: 14 μm) into 500 parts by mass of MEK and adding 120 parts by mass (molar ratio [NCO]/[OH]=1.5) of an isocyanate curing agent (Coronate HX, made by Nippon Polyurethane Industry Co., Ltd. NCO %=21%) and then stirring with a stirring motor for 30 minutes. A developing roller is prepared by using the thus obtained coating composition instead of the coating composition of Example 5.

COMPARATIVE EXAMPLE 5

A coating composition for a surface coating layer is prepared by dispersing 100 parts by mass of a lactone-modified polyol (trial PCL220B, made by Daicel Chemical Industries, Ltd. Mn=2000, Mw/Mn=2.8), 30 parts by mass of carbon black and 10 parts by mass of urethane particles (Artpearl C800, made by Negami Kogyo Co., Ltd. Average particle size: 8.8 μm) into 500 parts by mass of MEK and adding 30 parts by mass (molar ratio [NCO]/[OH]=1.5) of an isocyanate curing agent (Coronate HX, made by Nippon Polyurethane Industry Co., Ltd. NCO %=21%) and then stirring with a stirring motor for 30 minutes. A developing roller is prepared by using the thus obtained coating composition instead of the coating composition of Example 5.

With respect to the developing rollers of these examples and comparative examples, the properties of the surface coating layer, the properties of the developing roller and the imaging properties are measured by the following methods. The evaluation results of these examples and comparative examples are shown in Table 2.

(1) Number Average Molecular Weight (Mn) and Molecular Weight Distribution

The number average molecular weight (Mn) and molecular weight distribution of the polyol used in the formation of the each coating composition are calculated based on a monodisperse polystyrene sample by a gel permeation chromatography (GPC).

(2) Storage Modulus

The coating composition for the surface coating layer of the developing roller of each of the examples and comparative examples is shaped into a film by a cast method and cured by heating at 100° C. for 1 hour after the solvent is evaporated sufficiently to form a coated film of 0.3 mm. Thereafter, a measuring sample is formed by punching out the film at a width of 6 mm. The storage modulus is measured by setting the sample at a distance between chucks of 30 mm in a dynamic viscoelastic device of Model DDV-01FP (made by A & D Corp.) and conducting the measurement in a stretch mode under conditions of a frequency: 10 Hz, a strain: 1%, a temperature rising rate: 5° C./min and a temperature range: −50° C.-80° C. In this case, E'(25° C.) shows a storage modulus at 25° C.

(3) Roller Resistance

The roller resistance is determined as follows. That is, the outer peripheral face of the developing roller is pushed onto a cylindrical opposed electrode under a pressure of 1 kg and a voltage of 100 V is applied between the shaft and the opposed electrode, and the roller resistance is measured from a current value thereof.

(4) Surface Roughness

The arithmetic average roughness (Ra) and 10 point average roughness (Rz) are evaluated according to JIS B0601.

(5) Surface Hardness

The surface hardness of the developing roller to be tested is measured by using a microrubber hardness meter MD-1 (made by Koubunshi Keikisha Co., Ltd.).

(6) Contamination of Photosensitive Drum

The developing roller to be tested is pushed onto the photosensitive drum under a load of 1 kg and left to stand under high temperature, high humidity condition of 40° C. and 95% RH. After the lapse of a predetermined period (1 week), the developing roller is taken out and assembled into an actual machine to conduct the imaging, and the image in the contact part between the developing roller and the photosensitive drum is evaluated according to the following standard: ○: no contamination of the photosensitive drum, Δ: slight contamination of the photosensitive drum and ×: contamination of the photosensitive drum due to bleeding.

(7) Compression Permanent Strain

The same test as in the above contamination of the photosensitive drum is carried out to evaluate the image in the contact part between the developing roller and the photosensitive drum according to the following standard: ○: no contact trace with the photosensitive drum, Δ: slight contact trace with the photosensitive drum and ×: clear contact trace with the photosensitive drum.

(8) Imaging Concentration

The developing roller to be tested is assembled into a cartridge and then the continuous formation of images is carried out at a printing rate of 2% in a color printer of LBP 4600 made by Hewlett-Packard Co. under low temperature, low humidity (LL) environment (15° C., 10% RH), normal temperature, normal humidity (NN) environment (25° C., 50% RH) or high temperature, high humidity (HH) environment (30° C., 80% RH), whereby a one color image and a half tone image are formed at an initial stage and after the printing of 5000 papers, respectively. These one color images and half tone images are visually evaluated according to the following standard: ○: absence of concentration unevenness, Δ: slight presence of concentration unevenness and ×: presence of concentration unevenness.

(9) Fogging Resistance

After the operation of the printer is forcedly stopped during the formation of the one white color image, the flying amount of the toner onto the photosensitive drum in the white portion is measured by comparing concentration based on a tape transfer (by means of a Macbeth concentration meter). ○: less than 0.15, Δ: 0.15-0.20 and ×: more than 0.20.

(10) Resistance to Toner Fusion

The developing roller to be tested is dredged on its surface with the toners and assembled into a cartridge, which is left to stand at 40° C. and 95% RH for 1 week, and then the formation of images is carried out. ○: no adhesion of the toner onto the surface of the developing roller from a first image, Δ: no adhesion of the toner onto the surface of the developing roller up to a tenth image and ×: observation of toner adhesion on the surface of the developing roller even over a tenth image.

TABLE 2

| | | | Example | | | | | | |
|---|---|---|---|---|---|---|---|---|---|
| | | | 5 | 6 | 7 | 8 | 9 | 10 | 11 |
| Properties | Number average molecular weight of polyol (Mn) | | 1000 | 3000 | 5000 | 5000 | 1000 | 3000 | 5000 |
| | Molecular weight distribution (Mw/Mn) | | 1.7 | 2.1 | 2.3 | 2.3 | 1.7 | 2.1 | 2.3 |
| | Elastic modulus of surface coating layer (MPa) | | 42 | 27 | 18 | 26 | 47 | 36 | 29 |
| | Roller resistance (Ω/100) | | 6.5E+06 | 7.2E+06 | 5.5E+06 | 5.2E+06 | 4.9E+06 | 3.9E+06 | 6.9E+06 |
| | Surface roughness Ra (μm) | | 0.9 | 1.0 | 1.2 | 1.1 | 1.0 | 0.8 | 0.9 |
| | Surface roughness Rz (μm) | | 6.1 | 5.7 | 6.4 | 5.5 | 5.4 | 5.1 | 5.9 |
| | Surface hardness (°) | | 43 | 45 | 46 | 29 | 39 | 41 | 40 |
| | Contamination of photosensitive drum | | ○ | ○ | ○ | ○ | ○ | ○ | ○ |
| Image properties | One color image | initial | ○ | ○ | ○ | ○ | ○ | ○ | ○ |
| | | durable | ○ | ○ | ○ | ○ | ○ | ○ | ○ |
| | Half tone image | initial | ○ | ○ | ○ | ○ | ○ | ○ | ○ |
| | | durable | ○ | ○ | ○ | ○ | Δ | ○ | Δ |
| | Trace of compression permanent strain | | ○ | ○ | ○ | ○ | ○ | ○ | ○ |
| | Fogging resistance | | ○ | ○ | ○ | ○ | ○ | ○ | ○ |
| | Resistance to toner fusion | | ○ | ○ | ○ | ○ | ○ | ○ | Δ |

| | | Example | | | Comparative Example | | |
|---|---|---|---|---|---|---|---|
| | | 12 | 13 | 14 | 3 | 4 | 5 |
| Properties | Number average molecular weight of polyol (Mn) | 5000 | 1000 | 1000 | 2000 | 500 | 2000 |
| | Molecular weight distribution (Mw/Mn) | 2.3 | 1.9 | 1.7 | 2.2 | 1.6 | 2.8 |

TABLE 2-continued

| | | | | | | | |
|---|---|---|---|---|---|---|---|
| | Elastic modulus of surface coating layer (MPa) | 47 | 53 | 38 | 25 | 55 | 22 |
| | Roller resistance (Ω/100) | 7.0E+06 | 4.0E+06 | 4.1E+06 | 5.9E+06 | 5.4E+06 | 6.1E+06 |
| | Surface roughness Ra (μm) | 0.9 | 1.0 | 1.2 | 1.1 | 1.2 | 0.9 |
| | Surface roughness Rz (μm) | 5.9 | 6.0 | 6.2 | 6.3 | 6.5 | 5.9 |
| | Surface hardness (°) | 40 | 39 | 34 | 46 | 44 | 43 |
| | Contamination of photosensitive drum | ○ | ○ | ○ | ○ | ○ | ○ |
| Image properties | One color image initial | ○ | ○ | ○ | ○ | ○ | ○ |
| | One color image durable | ○ | Δ | ○ | Δ | Δ | Δ |
| | Half tone image initial | ○ | ○ | ○ | ○ | ○ | ○ |
| | Half tone image durable | Δ | Δ | ○ | X | Δ | Δ |
| | Trace of compression permanent strain | Δ | ○ | Δ | X | Δ | X |
| | Fogging resistance | ○ | ○ | ○ | ○ | ○ | Δ |
| | Resistance to toner fusion | ○ | ○ | ○ | X | X | Δ |

As seen from Table 2, the developing rollers of the examples according to the invention can stably form the good image because the photosensitive drum is not contaminated and the compression permanent strain is low and the trace due to the pressing of the blade is not caused and the damage on the toner is small and the resistance to toner fusion is excellent.

EXAMPLE 15

A coating composition for a middle coating layer is prepared by dispersing 5 parts by mass of carbon black into 100 parts by mass of an aqueous acryl resin (made by Nogawa Chemicals Co., Ltd.). Also, a coating composition for a surface coating layer is prepared by dispersing 100 parts by mass of a caprolactone-modified acrylurethane (made by Azia Kogyo Co., Ltd. Introduction of silicone into urethane portion), 35 parts by mass of carbon black and 50 parts by mass o f an isocyanurate-modified HDI (Coronate HX, made by Nippon Polyurethane Industry Co., Ltd.) into 300 parts by mass of methylethyl ketone (MEK). The coating composition for the middle coating layer is applied onto the outer periphery of the roller body having the elastic layer made of the polyurethane foam to form a middle coating layer, and thereafter the coating composition for the surface coating layer is applied to form a surface coating layer to thereby prepare a developing roller. Then, the roller resistance, 10 point average roughness (Rz), Asker C hardness, friction coefficient, toner charging property of the thus obtained developing roller are evaluated by the known methods, while the printing is carried out by assembling the developing roller into a laser printer to evaluate the image properties. Also, the developing roller is assembled into a cartridge and kept under an environment of 50° C. and 90% RH for 1 week, and thereafter the presence or absence of contamination of the photosensitive drum and the presence or absence of traces on the surface of the developing roller due to the pressing of the blade are measured. The results are shown in Table 3.

EXAMPLE 16

A coating composition for a middle coating layer is prepared by dispersing 5 parts of carbon black into 100 parts by mass of an aqueous urethane resin (made by Dai-ichi Kogyo Seiyaku Co., Ltd.). Also, a coating composition for a surface coating layer is prepared by dispersing 100 parts by mass of a caprolactone-modified acrylurethane (made by Azia Kogyo Co., Ltd. Introduction of silicone into acryl portion), 35 parts by mass of carbon black and 50 parts by mass of an isocyanurate-modified HDI (Coronate HX, made by Nippon Polyurethane Industry Co., Ltd.) into 300 parts by mass of MEK. A developing roller is prepared by using the thus obtained coating compositions for the middle coating layer and the surface coating layer instead of the coating compositions of Example 15 and evaluated. The results are shown in Table 3.

EXAMPLE 17

A coating composition for a middle coating layer is prepared by dispersing 5 parts of carbon black into 100 parts by mass of an aqueous latex (made by Kouatsu Gas Kogyo Co., Ltd.). Also, a coating composition for a surface coating layer is prepared by dispersing 100 parts by mass of a caprolactone-modified acrylurethane (made by Azia Kogyo Co., Ltd. Introduction of silicone into acryl portion), 35 parts by mass of carbon black and 50 parts by mass of an isocyanurate-modified HDI (Coronate HX, made by Nippon Polyurethane Industry Co., Ltd.) into 300 parts by mass of MEK. A developing roller is prepared by using the thus obtained coating compositions for the middle coating layer and the surface coating layer instead of the coating compositions of Example 15 and evaluated. The results are shown in Table 3.

EXAMPLE 18

A coating composition for a surface coating layer is prepared by dispersing 100 parts by mass of a caprolactone-modified acrylurethane (made by Azia Kogyo Co., Ltd. Introduction of silicone into acryl portion), 35 parts by mass of carbon black and 50 parts by mass o f a cyanurate-modified HDI (Coronate HX, made by Nippon Polyurethane Industry Co., Ltd.) into 300 parts by mass of MEK. A developing roller is prepared by using the thus obtained coating composition for the surface coating layer instead of the coating composition of Example 15 without forming the middle coating layer and evaluated. The results are shown in Table 3.

COMPARATIVE EXAMPLE 6

A coating composition for a middle coating layer is prepared by dispersing 5 parts of carbon black into 100 parts by mass of an aqueous acryl resin (made by Nogawa Chemicals Co., Ltd.). Also, a coating composition for a surface coating layer is prepared by dispersing 100 parts by mass of a urethane acryl paint not introducing silicone (made by Azia Kogyo Co., Ltd.), 35 parts by mass of carbon black and 50 parts by mass of an isocyanurate-modified HDI (Coronate HX, made by Nippon Polyurethane Industry Co., Ltd.) into 300 parts by mass of MEK. A developing roller is prepared by using the thus obtained coating compositions for the middle coating layer and the surface coating layer instead of the coating compositions of Example 15 and evaluated. The results are shown in Table 3.

COMPARATIVE EXAMPLE 7

A coating composition for a middle coating layer is prepared by dispersing 5 parts of carbon black into 100 parts by mass of an aqueous urethane resin (made by Dai-ichi Kogyo Seiyaku Co., Ltd.). Also, a coating composition for a surface coating layer is prepared by dispersing 100 parts by mass of a urethaneacryl resin not introducing silicone (made by Azia Kogyo Co., Ltd.), 35 parts by mass of carbon black and 50 parts by mass of an isocyanurate-modified HDI (Coronate HX, made by Nippon Polyurethane Industry Co., Ltd.) into 300 parts by mass of MEK. A developing roller is prepared by using the thus obtained coating compositions for the middle coating layer and the surface coating layer instead of the coating compositions of Example 15 and evaluated. The results are shown in Table 3.

As seen from Table 3, the developing rollers of the examples according to the invention can stably form the good image because the photosensitive drum is not contaminated and the compression permanent strain is low and the trace due to the pressing of the blade is not caused and the frictional resistance on the surface is low and the damage on the toner is small.

What is claimed is:

1. A developing roller comprising a shaft, an elastic layer formed on an outer periphery of the shaft and a surface coating layer formed on an outer peripheral face of the elastic layer, in which the surface coating layer comprises a urethane resin formed by crosslinking a lactone-modified polyol with a polyisocyanate, wherein the urethane resin of the surface coating layer has a structure that a silicone having a siloxane bond is introduced into a resin skeleton, wherein the urethane resin has a structure that a silicone having a siloxane bond and a hydroxyl group or an amino group in its both terminals is introduced into a urethane portion, and wherein the lactone-modified polyol has a number average molecular weight (Mn) converted to polystyrene of 1000-5000 as measured through a gel permeation chromatography and a molecular weight distribution (Mw/Mn) represented by a ratio of weight average molecular weight (Mw) to number average molecular weight (Mn)

TABLE 3

| | | Example | | | | Comparative Example | |
|---|---|---|---|---|---|---|---|
| | | 15 | 16 | 17 | 18 | 6 | 7 |
| Elastic layer | resin | urethane foam | urethane foam | urethane foam | urethane foam | urethane foam | urethane foam |
| Middle coating layer | resin | acryl resin | urethane resin | latex | — | acryl resin | urethane resin |
| Surface coating layer | resin | | | | | | |
| | introduction site of silicone | urethane portion | acryl portion | acryl portion | acryl portion | none | none |
| Properties | roller resistance (Ω/100 V) | $2.5 \times 10^6$ | $3.7 \times 10^6$ | $4.2 \times 10^6$ | $2.5 \times 10^6$ | $3.9 \times 10^6$ | $2.6 \times 10^6$ |
| | Rz (μm) | 5.4 | 5.6 | 6.5 | 5.7 | 5.9 | 6.5 |
| | Hardness(Asker C) | 51 | 46 | 45 | 60 | 48.6 | 48.8 |
| | Friction coefficient (μs) | 0.38 | 0.35 | 0.34 | 0.33 | 0.78 | 0.80 |
| | toner charging property | ○ | ○ | ○ | ○ | ○ | ○ |
| Image properties | image concentration | ○ | ○Δ | ○ | ○Δ | X (developing streak) | X (developing streak) |
| | fogging | ○ | ○ | ○ | ○ | Δ | Δ |
| | half tone unevenness | ○ | ○ | ○ | ○ | unevenness | unevenness |
| Resistance to contamination of photosensitive drum | after keeping at 50° C. and 90% RH for 1 week | ○ | ○ | ○ | ○ | Δ | ○ |
| Trace due to pressing of blade | | ○ | ○ | ○ | ○ | X | X |

○: good,
○Δ: slightly good,
Δ: slightly bad,
X: bad converted to polystyrene of not more than 2.5 as measured through the gel permeation chromatography.

2. A developing roller according to claim 1, wherein the urethane resin is formed by crosslinking the lactone-modified polyol with at least two kinds of polyisocyanates.

3. A developing roller according to claim 2, wherein the polyisocyanate contains at least one of isocyanurate-modified hexamethylene diisocyanate or isophorone diisocyanate.

4. A developing roller according to claim 1, wherein the lactone-modified polyol has a molar ratio ([NCO]/[OH]) of isocyanate group (NCO) of the polyisocyanate to hydroxyl group (OH) of 1.0-2.5.

5. A developing roller according to claim 1, wherein the surface coating layer has a storage modulus (E') at 25° C. of 3-50 MPa.

6. A developing roller according to claim 1, wherein the surface coating layer has a thickness of not more than 30 μm.

7. A developing roller according to claim 1, wherein a number average molecular weight of the silicone introduced into the resin skeleton is 500-10000.

8. A developing roller according to claim 1, wherein the urethane resin of the surface coating layer is an acrylurethane resin formed by crosslinking a lactone-modified polyol with a polyisocyanate.

9. A developing roller according to claim 8, wherein the acrylurethane resin has a structure that a silicone having a siloxane bond and a methacryloxy group in its one terminal is introduced into an acryl portion.

10. A developing roller according to claim 8, wherein the acrylurethane resin has a structure that the lactone-modified polyol is introduced into a urethane portion.

11. A developing roller according to claim 1, wherein the surface coating layer contains 5-35 parts by mass of carbon black per 100 parts by mass of the lactone-modified polyol.

12. A developing roller according to claim 1, wherein the surface coating layer further contains an electrically conducting agent.

13. A developing roller according to claim 1, wherein the elastic layer is made of a urethane foam obtained by foaming a urethane starting material with mechanical stirring.

14. A developing roller according to claim 13, wherein the urethane foam constituting the elastic layer has closed cells.

15. A developing roller according to claim 13, wherein a middle coating layer made from a mixed solution of a polymer and an aqueous solvent is formed between the urethane foam as the elastic layer and the surface coating layer.

16. A developing roller according to claim 15, wherein the middle coating layer is made of an acrylic resin, a urethane resin or a rubber latex.

17. A developing roller according to claim 15, wherein the middle coating layer has a glass transition temperature of not higher than 10° C.

18. A developing roller according to claim 15, wherein the middle coating layer is constituted from two or more layers.

19. A developing roller according to claim 15, wherein the middle coating layer further contains an electrically conducting agent.

20. A developing roller according to claim 15, wherein a total thickness of the middle coating layer and the surface coating layer is not more than 100 μm.

21. A developing roller according to claim 1, wherein the roller has a 10-point average surface roughness (Rz) of not more than 10 μm.

22. An imaging apparatus characterized by comprising a developing roller as claimed in claim 1.

* * * * *